United States Patent
Takata et al.

(10) Patent No.: US 10,621,347 B2
(45) Date of Patent: Apr. 14, 2020

(54) BROWSER EMULATOR DEVICE, CONSTRUCTION DEVICE, BROWSER EMULATION METHOD, BROWSER EMULATION PROGRAM, CONSTRUCTION METHOD, AND CONSTRUCTION PROGRAM

(71) Applicant: NIPPON TELEGRAPH AND TELEPHONE CORPORATION, Chiyoda-ku (JP)

(72) Inventors: Yuta Takata, Musashino (JP); Mitsuaki Akiyama, Musashino (JP); Takeshi Yagi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 49 days.

(21) Appl. No.: 15/329,305

(22) PCT Filed: Jul. 30, 2015

(86) PCT No.: PCT/JP2015/071720
§ 371 (c)(1),
(2) Date: Jan. 26, 2017

(87) PCT Pub. No.: WO2016/024480
PCT Pub. Date: Feb. 18, 2016

(65) Prior Publication Data
US 2017/0228541 A1    Aug. 10, 2017

(30) Foreign Application Priority Data
Aug. 11, 2014 (JP) .................... 2014-163539

(51) Int. Cl.
*G06F 21/51* (2013.01)
*G06F 21/53* (2013.01)
(Continued)

(52) U.S. Cl.
CPC .......... *G06F 21/566* (2013.01); *G06F 21/577* (2013.01); *H04L 63/145* (2013.01);
(Continued)

(58) Field of Classification Search
CPC .......... G06F 21/51; G06F 21/52; G06F 21/53; G06F 21/563; G06F 21/566;
(Continued)

(56) References Cited

U.S. PATENT DOCUMENTS 6,857,124 B1 * 2/2005 Doyle ................ G06F 9/45512
709/203
7,802,298 B1 * 9/2010 Hong ................... G06F 21/51
705/51
(Continued)

FOREIGN PATENT DOCUMENTS

CN     101719093 A    6/2010
CN     101853277 A    10/2010
(Continued)

OTHER PUBLICATIONS

Authors: Marco Cova, Christopher Kruegel, and Giovanni Vigna from University of California, Santa Barbara Title: Detection and Analysis of Drive-by-Download Attacks and Malicious JavaScript Code, p. 10 Publisher: International World Wide Web Conference Committee (IW3C2) (Year: 2010).*

(Continued)

*Primary Examiner* — Jeffrey C Pwu
*Assistant Examiner* — Ali H. Cheema
(74) *Attorney, Agent, or Firm* — Oblon, McClelland, Maier & Neustadt, L.L.P.

(57) ABSTRACT

A browser emulator is caused to emulate a client environment that is arbitrary values of types and versions of an OS, a browser, and a plugin. Further, the browser emulator monitors execution of a script or a plugin. A browser
(Continued)

emulator manager then causes the browser emulator to patrol a predetermined Web site, and accumulates, in an analysis information database, results of access to the Web site in association with information on client environments emulated upon the access to the Web site. The browser emulator manager then refers to the accumulated results of access, and identifies a Web site that causes a difference between results of access according to a difference between client environments.

7 Claims, 11 Drawing Sheets

(51) Int. Cl.
G06F 21/56 (2013.01)
G06F 21/57 (2013.01)
H04L 29/06 (2006.01)

(52) U.S. Cl.
CPC .......... *H04L 63/1441* (2013.01); *G06F 21/51* (2013.01); *G06F 21/53* (2013.01); *G06F 21/56* (2013.01); *G06F 21/57* (2013.01); *G06F 2221/03* (2013.01); *G06F 2221/034* (2013.01); *G06F 2221/2101* (2013.01); *G06F 2221/2119* (2013.01); *G06F 2221/2149* (2013.01); *H04L 29/06* (2013.01)

(58) Field of Classification Search
CPC ...... G06F 21/577; G06F 11/3688; G06F 1/00; G06F 9/45533; G06F 21/57; G06F 21/56; G06F 2221/03; G06F 2221/034; G06F 2221/2101; G06F 2221/2119; G06F 2221/2149; G06F 9/5055; G06F 9/45512; G06F 15/173; G06F 8/36; H04L 63/1433; H04L 63/1425; H04L 63/101; H04L 63/14; H04L 63/1441; H04L 29/06; G06Q 20/04
USPC ............ 726/3, 22, 23, 24, 25, 1, 5; 713/161, 713/167, 100; 719/316; 717/121; 715/760; 709/220, 224, 218
See application file for complete search history.

(56) References Cited

U.S. PATENT DOCUMENTS

| | | | | |
|---|---|---|---|---|
| 8,346,753 | B2* | 1/2013 | Hayes | G06F 16/951 707/709 |
| 8,448,241 | B1* | 5/2013 | Kadakia | G06F 11/3688 726/22 |
| 8,646,072 | B1* | 2/2014 | Savant | G06F 21/51 709/229 |
| 8,806,646 | B1* | 8/2014 | Daswani | H04L 63/1425 713/161 |
| 8,839,428 | B1* | 9/2014 | Oliver | G06F 21/566 709/224 |
| 8,850,570 | B1* | 9/2014 | Ramzan | G06F 1/00 726/22 |
| 2001/0047343 | A1* | 11/2001 | Dahan | G06Q 20/04 705/76 |
| 2003/0093572 | A1* | 5/2003 | Laux | G06F 9/5055 709/250 |
| 2003/0115296 | A1* | 6/2003 | Jantz | H04L 29/06 709/220 |
| 2004/0117170 | A1 | 6/2004 | Walsh et al. | |
| 2004/0133796 | A1* | 7/2004 | Cohen | G06F 21/566 726/24 |
| 2005/0203882 | A1* | 9/2005 | Godley | G06F 16/9566 |
| 2005/0228990 | A1* | 10/2005 | Kato | G06F 21/53 713/167 |
| 2006/0101514 | A1 | 5/2006 | Milener et al. | |
| 2007/0067848 | A1* | 3/2007 | Gustave | G06F 21/577 726/25 |
| 2007/0174915 | A1 | 7/2007 | Gribble et al. | |
| 2008/0133540 | A1* | 6/2008 | Hubbard | H04L 63/101 |
| 2008/0235756 | A1* | 9/2008 | Cohen | G06F 9/45533 726/1 |
| 2009/0328209 | A1* | 12/2009 | Nachenberg | G06Q 10/10 726/22 |
| 2010/0192223 | A1 | 7/2010 | Ismael et al. | |
| 2010/0312879 | A1* | 12/2010 | Taieb | G06F 8/20 709/224 |
| 2010/0325615 | A1* | 12/2010 | Ramot | G06F 11/3672 717/124 |
| 2011/0219311 | A1* | 9/2011 | Diament | G06F 15/173 715/736 |
| 2011/0239294 | A1* | 9/2011 | Kim | G06F 21/563 726/22 |
| 2012/0159621 | A1* | 6/2012 | Jeong | G06F 21/563 726/22 |
| 2012/0233692 | A1* | 9/2012 | Oh | G06F 21/52 726/22 |
| 2012/0272317 | A1 | 10/2012 | Rubin et al. | |
| 2013/0014259 | A1 | 1/2013 | Gribble et al. | |
| 2013/0080930 | A1* | 3/2013 | Johansson | G06F 9/46 715/760 |
| 2013/0117845 | A1* | 5/2013 | Kerschbaumer | G06F 21/53 726/22 |
| 2013/0124687 | A1* | 5/2013 | Nam | H04L 63/1483 709/218 |
| 2013/0232331 | A1* | 9/2013 | Farhan | G06F 11/3006 713/100 |
| 2013/0298240 | A1* | 11/2013 | Gerber | G06F 21/56 726/23 |
| 2013/0346945 | A1* | 12/2013 | Yousouf | G06F 8/36 717/121 |
| 2014/0137190 | A1* | 5/2014 | Carey | H04L 63/1433 726/3 |
| 2015/0326607 | A1 | 11/2015 | Gribble et al. | |

FOREIGN PATENT DOCUMENTS

| | | | | | |
|---|---|---|---|---|---|
| CN | 201110154271 | A | * | 6/2011 | ............ G06F 9/46 |
| CN | 102955913 | A | | 3/2013 | |
| JP | 2005315273 | A | * | 10/2005 | ............ G06F 17/21 |
| JP | 2008163952 | A | * | 6/2008 | ............ G06F 9/50 |

OTHER PUBLICATIONS

Detection and Analysis of Drive-by-Download Attacks and Malicious JavaScript Code Marco Cova, Christopher Kruegel, and Giovanni Vigna University of California, Santa Barbara Apr. 26-30, 2010 (Year: 2010).*
Detecting Malicious Websites by Learning IP Address Features Daiki Chiba, Kazuhiro Tobe, Tatsuya Mori and Shigeki Goto Department of Computer Science and Engineering, Waseda University pp. 11 (Year: 2012).*
Detection of Intrusions and Malware, and Vulnerability Assessment Ulrich Flegel and Danilo Bruschi 6th International Conference, DIMVA 2009 Como, Italy, Jul. 2009, pp. 233 (Year: 2009).*
Secure Cross-Domain Communication for Web Mashups Collin Jackson and Helen J. Wang pp. 9 (Year: 2007).*
Detection and Analysis of Drive-by-Download Attacks and Malicious JavaScript Code Marco Cova, Christopher Kruegel, and Giovanni Vigna University of California, Santa Barbara {marco,chris,vigna}@cs.ucsb.edu, pp. 10 (Year: 2010).*
Jose Nazario, "PhoneyC: A Virtual Client Honeypot," https://www.usenix.org/legacy/event/leet09/tech/full_papers/nazario/nazario.pdf, Apr. 1, 2009, (pp. 1-8).
Marco Cova, et al., "Detection and Analysis of Drive-by-Download Attacks and Malicious JavaScript Code," https://www.cs.ucsb.edu/~vigna/publications/2010_cova-kruegel_vigna_Wepawet.pdf, Jun. 19, 2014, (10 pages).
Clemens Kolbitsch, et al. "Rozzle: De-Cloaking Internet Malware," http://research.microsoft.com/pubs/162710/oakland12.pdf, Jun. 19, 2014, (15 pages).

(56) References Cited

OTHER PUBLICATIONS

Yuta Takata, et al., "An Investigation of Malicious JavaScript Code used in Drive-by Download," http://www.ieice.org/ken/paper/20140327QBIZ/, Jun. 19, 2014, (5 pages) (with English translation).

Takahiro Kasama, et al., "Malicious Web Site Detection Based on Redirection Control using Client Environment," IEICE Technical Report, vol. 114, No. 71, May 29, 2014, (22 pages) (with partial English translation).

Yaser Alosefer, et al., "Honeyware: a web-based low interaction client honeypot," Third International Conference on Software Testing, Verification, and Validation Workshops, IEEE Computer Society, Apr. 6, 2010, (pp. 410-417).

Yuta Takata, et al., "An Investigation of Malicious JavaScript Code used in Drive-by Download," IPSJ SIG Notes Security Psychology & Trust (SPT) 2014-SPT-008 [online], Mar. 26, 2014, (26 pages) (with partial English translation).

International Search Report dated Oct. 13, 2015 in PCT/JP2015/071720 filed Jul. 30, 2015.

Office Action dated Jan. 31, 2017 in Japanese Patent Application No. 2016-542532 (with English translation).

Extended European Search Report dated Dec. 11, 2017 in European Patent Application No. 15832306.3, 7 pages.

Office Action dated Jan. 30, 2019 in Chinese Application No. 201580042383.1 (w/English translation).

\* cited by examiner

- USER-AGENT EXAMPLE USED UPON HTTP COMMUNICATION
- OS: A7, BROWSER: C9

Mozilla/5.0 (compatible; C9; A7)

- EXAMPLE OF navigator.plugins
- PLUGINS: G9 AND H12

```
navigator.plugins = {
 "name": "G"
 "filename": "pdf.dll"
 "description": "G Plug-In 9",
 "version": "9"
};
navigator.plugins = {
 "name": "H"
 "filename": "libflashplayer.so"
 "description": "H 12",
 "version": "12"
};
```

FIG.5

·VULNERABILITY INFORMATION

| VULNER-ABILITY ID | CVE NUMBER | OS ID | BROWSER ID | PLUGIN ID |
|---|---|---|---|---|
| 1 | CVE-2009-2477 | | 101,102 | |
| 2 | CVE-2009-3867 | | | 101,102 |
| 3 | CVE-2010-1885 | 2 | | |
| ... | ... | ... | ... | |
| 101 | CVE-2011-1255 | | 1,2,3 | |
| 102 | CVE-2011-2371 | | 101,102,103 | |
| 103 | CVE-2011-3659 | | 101,102 | |
| ... | ... | ... | ... | |

FIG.6A

·OS INFORMATION

| OS ID | OS | VERSION |
|---|---|---|
| 1 | A | 1 |
| 2 | A | 2 |
| 3 | A | 3 |
| ... | ... | ... |
| 101 | B | 10.6 |
| 102 | B | 10.7 |
| 103 | B | 10.8 |
| ... | ... | ... |

FIG.6B

·PLUGIN INFORMATION

| PLUGIN ID | PLUGIN | VERSION |
|---|---|---|
| 1 | G | 8 |
| 2 | G | 8 |
| 3 | G | 9 |
| ... | ... | ... |
| 101 | H | 8 |
| 102 | H | 8 |
| 103 | H | 8 |
| ... | ... | ... |

FIG.6C

·BROWSER INFORMATION

| BROWSER ID | BROWSER | VERSION |
|---|---|---|
| 1 | C | 6 |
| 2 | C | 7 |
| 3 | C | 8 |
| ... | ... | ... |
| 101 | D | 8 |
| 102 | D | 8.5 |
| 103 | D | 9 |
| ... | ... | ... |

FIG.7A

·ANALYSIS INFORMATION

| ANALYSIS ID | ANALYZED URL | OS ID | BROWSER ID | PLUGIN ID |
|---|---|---|---|---|
| 1 | http://example.com | 2 | 1 | 1 |
| 2 | http://example.com | 2 | 1 | 2 |
| 3 | http://example.com | 2 | 1 | 3 |
| ... | ... | ... | ... | ... |
| 101 | http://sample.com | 3 | 1 | 103 |
| 102 | http://sample.com | 3 | 2 | 103 |
| 103 | http://sample.com | 3 | 3 | 103 |
| ... | ... | ... | ... | ... |

FIG.7B

·ACCESS INFORMATION

| ACCESS ID | ANALYSIS ID | TIME STAMP | ACCESSED URL | ATTACK CODE INFORMATION |
|---|---|---|---|---|
| 1 | 1 | 2014/06/23 16:00:00.0000 | http://example.com | |
| 2 | 1 | 2014/06/23 16:00:05.0000 | http://example.com/test.html | G,E |
| 3 | 1 | 2014/06/23 16:00:10.0000 | http://example.com/mal.pdf | |
| ... | ... | ... | ... | ... |
| 10 | 2 | 2014/06/23 16:00:00.0000 | http://example.com | |
| 11 | 2 | 2014/06/23 16:00:05.0000 | http://example.com/test.html | G |
| 12 | 3 | 2014/06/23 16:00:10.0000 | http://example.com | |
| ... | ... | ... | ... | ... |

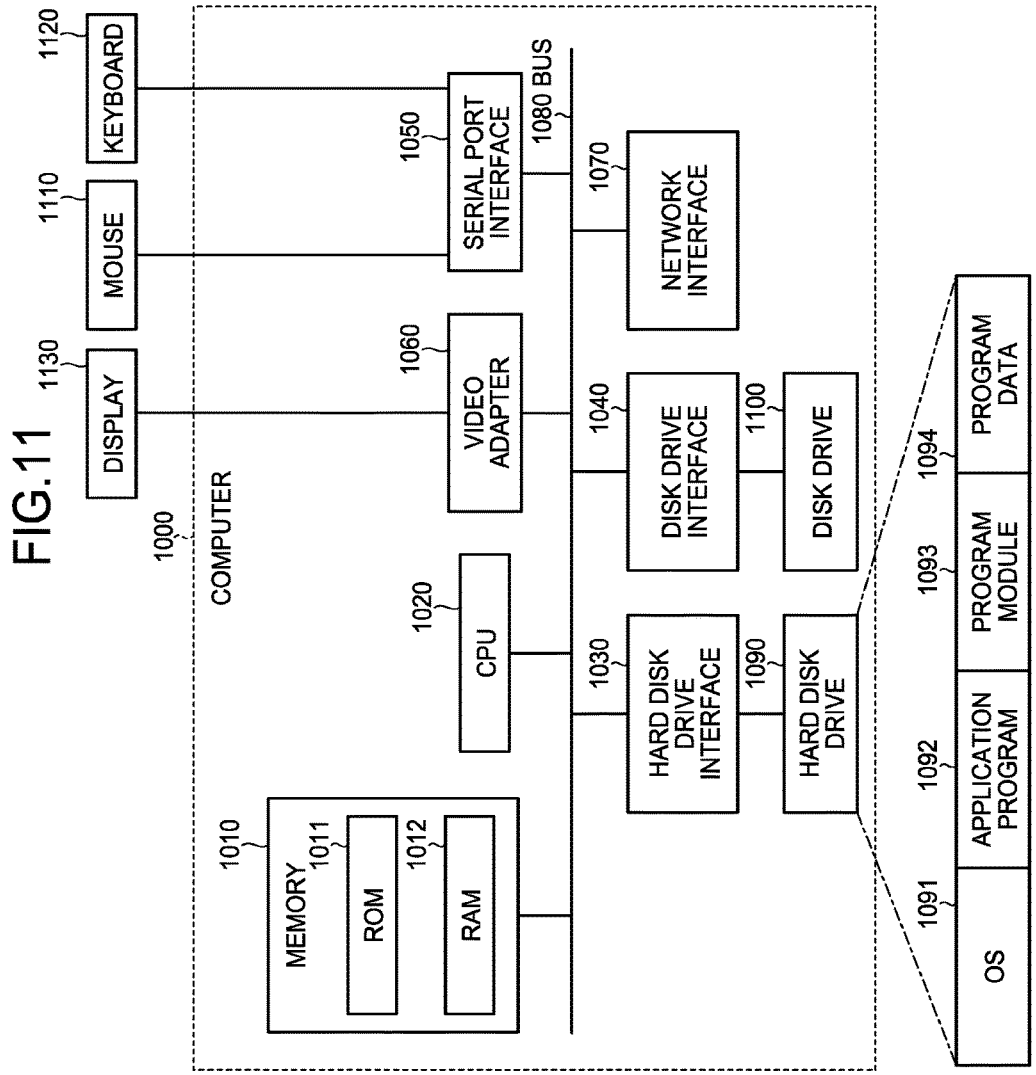

BROWSER EMULATOR DEVICE, CONSTRUCTION DEVICE, BROWSER EMULATION METHOD, BROWSER EMULATION PROGRAM, CONSTRUCTION METHOD, AND CONSTRUCTION PROGRAM

FIELD

The present invention relates to a browser emulator device, a construction device, a browser emulation method, a browser emulation program, a construction method, and a construction program.

BACKGROUND

Conventionally, in order to detect malicious scripts that cause malicious programs, such as computer viruses, to be downloaded and installed (for example, JavaScript (registered trademark)), techniques using emulators of browsers (hereinafter, referred to as "browser emulators") have been proposed. For example, a technique has been proposed, which is for: causing a browser emulator to execute scripts of various Web sites; and analyzing results of the execution (see Non-Patent Literature 1 and Non-Patent Literature 2).

Such malicious scripts include scripts that obtain environment information of clients that have accessed their Web sites (malicious Web sites) and perform attacks according to environments of the clients, in order to improve success rates of the attacks (hereinafter, referred to as "environment dependent attacks", as seen in Non-Patent Literature 3). Attack codes used in these environment dependent attacks are, for example, hypertext markup language (HTML) tag insertion codes for reading files related to plugins of browsers from outside, and codes that abuse the vulnerabilities of ActiveX (registered trademark) (see Non-Patent Literature 4).

CITATION LIST

Non-Patent Literature

Non-Patent Literature 1: Jose Nazario, "PhoneyC: A Virtual Client Honeypot", [online], [retrieved on Jun. 19, 2014], from the Internet <URL:https://www.usenix.org/legacy/event/leet09/tech/full_papers/nazarionazario.pdf>

Non-Patent Literature 2: Marco Cova, Christopher Krugel, and Giovanni Vigna, "Detection and Analysis of Drive-by-Download Attacks and Malicious JavaScript Code", [online], [retrieved on Jun. 19, 2014], from the Internet <URL:https://www.cs.ucsb.edu/~vigna/publications/2010_cova_kruegel_vigna_Wepawet.pdf>

Non-Patent Literature 3: Clemens Kolbitsch, Benjamin Livshits, Benjamin Zorn, and Christian Seifert, "Rozzle: De-Cloaking Internet Malware", [online], [retrieved on Jun. 19, 2014], from the Internet <URL:http://research.microsoft.com/pubs/162710/oakland12.pdf>

Non-Patent Literature 4: Yuta Takata, Mitsuaki Akiyama, and Takeo Hariu, "An Investigation of Malicious JavaScript Code used in Drive-by Download", [online], [retrieved on Jun. 19, 2014], from the Internet <URL: http://www.ieice.org/ken/paper/20140327QBIZ/>

SUMMARY

Technical Problem

In order to detect a Web site that performs environment dependent attacks, it is important for a browser emulator to be able to emulate any types and versions for respective elements constituting a client environment, such as an operating system (OS), a browser, and a plugin, which are used in a client, the client environment being used in analysis, and to be able to flexibly change the client environment used in the analysis. However, the conventional techniques are only able to deal with types and versions of particular client environments and the client environments have been unable to be changed flexibly. Therefore, the conventional techniques have had a problem that Web sites that perform environment dependent attacks are difficult to be detected. Accordingly, an object of the present invention is to solve the above described problem and to facilitate detection of a Web site that performs environment dependent attacks.

Solution to Problem

To solve the problems described above, a browser emulator device that emulates operation of a browser, the browser emulator device comprising: an information setting unit that sets an arbitrary operating system (OS), an arbitrary browser, and an arbitrary plugin as a client environment of the browser emulator device itself; and an access unit that accesses an external Web site by emulating the OS, the browser, and the plugin set as the client environment upon the access, and outputs a result of the access to the Web site and information on the client environment used upon the access to the Web site.

Advantageous Effects of Invention

According to the present invention, detection of a Web site that performs environment dependent attacks is facilitated.

BRIEF DESCRIPTION OF DRAWINGS

FIG. 5 is a diagram illustrating an example of vulnerability information of a vulnerability information database.

FIG. 6A is a diagram illustrating an example of OS information of the vulnerability information database.

FIG. 6B is a diagram illustrating an example of plugin information of the vulnerability information database.

FIG. 6C is a diagram illustrating an example of browser information of the vulnerability information database.

FIG. 7A is a diagram illustrating an example of analysis information registered in an analysis information database.

FIG. 7B is a diagram illustrating an example of access information registered in the analysis information database.

FIG. 11 is a diagram illustrating a computer that executes a program realizing functions of the browser emulator and the browser emulator manager.

DESCRIPTION OF EMBODIMENTS

Hereinafter, with reference to the drawings, modes (embodiments) for carrying out the present invention will be described. The present invention is not limited by these embodiments.

Figure 1:
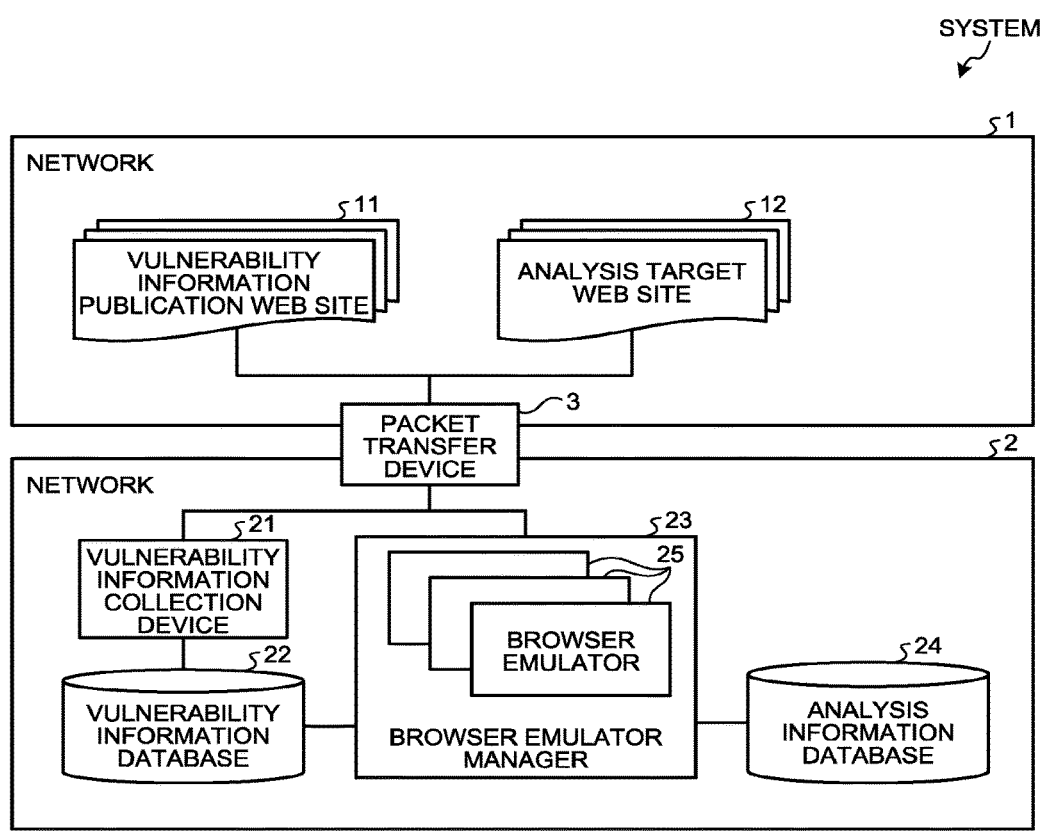
FIG. 1 is a diagram illustrating an example of a configuration of a system.

First of all, an example of a configuration of a system according to an embodiment will be described by use of FIG. 1. The system includes, for example, as illustrated in FIG. 1, a network 1 and a network 2. The network 1 and the network 2 are connected by a packet transfer device 3.

The network 1 includes a vulnerability information publication Web site 11 and an analysis target Web site 12. The network 1 may be a wide area network like the Internet, or may be a small to medium scale network like a corporate network or a network in a cloud environment or a hosting environment.

The vulnerability information publication Web site 11 is a Web site that publishes vulnerability information (for example, OSs, browsers, and plugins having vulnerabilities, contents of the vulnerabilities, and the like). This vulnerability information publication Web site 11 is, for example, a Web site of MITRE Corporation that performs numbering of Common Vulnerabilities and Exposures (CVE) numbers, a Web site that uniquely collects and publishes vulnerability information, or the like.

The analysis target Web site 12 is a Web site to be analyzed by a browser emulator manager (construction device) 23. This analysis target Web site 12 is, for example, a Web site published in a black list of malicious Web sites open to the public, or the like.

The vulnerability information publication Web site 11 and the analysis target Web site 12 are accessible from the network 2 via the packet transfer device 3.

Further, the network 2 includes a vulnerability information collection device 21, a vulnerability information database 22, a browser emulator manager 23, and an analysis information database 24. The vulnerability information collection device 21 and the browser emulator manager 23 are connected to the packet transfer device 3. The network 2 may be a small scale network like a local area network, or may be a small to medium scale network like a corporate network or a network in a cloud environment or a hosting environment.

The vulnerability information collection device 21 collects vulnerability information from the vulnerability information publication Web site 11 through the packet transfer device 3 and outputs the vulnerability information to the vulnerability information database 22. If the vulnerability information publication Web site 11 is a Web site described in hypertext markup language (HTML), the vulnerability information collection device 21 uses, for example, an HTML parser or an extensible markup language (XML) parser, which has been developed as an open source.

The vulnerability information database 22 accumulates (stores) therein the vulnerability information collected by the vulnerability information collection device 21. This vulnerability information is, for example, as illustrated in FIG. 5, information indicating, for each identification information of the vulnerability information (vulnerability ID), a CVE number corresponding to that vulnerability ID, and an ID of an OS (OS ID), an ID of a browser (browser ID), an ID of a plugin (plugin ID), and the like, that have vulnerabilities. Types and versions of the OS, the browser, and the plugin corresponding to the OS ID, the browser ID, and the plugin ID used in the vulnerability information in FIG. 5 are able to be identified by reference to, for example, OS information illustrated in FIG. 6A, plugin information illustrated in FIG. 6B, and browser information illustrated in FIG. 6C. The OS information, the plugin information, and the browser information are stored in, for example, the vulnerability information database 22.

For example, the record having the vulnerability ID, "1", in the vulnerability information illustrated in FIG. 5 indicates that the CVE number thereof is "CVE-2009-2477" and the targets are the browser IDs, "101" and "102". As illustrated in FIG. 6C, the browser ID, "101", corresponds to the version, "8", of the browser, "D", and the browser ID, "102", corresponds to the version, "8.5", of the browser, "D" (see FIG. 6C).

Storage of the vulnerability information into the vulnerability information database 22 may be, for example, carried out by a relational database management system (RDBMS), such as MySQL or SQLite, or the vulnerability information may be stored in a text format.

The browser emulator manager 23 in FIG. 1 manages one or more browser emulators (browser emulator devices) 25 and causes this browser emulator 25 to access a predetermined Web site (analysis target Web site 12). The browser emulator manager 23 identifies a Web site that causes a difference between access results according to a difference between client environments of the browser emulator 25, by using results of the access by the browser emulator 25. Thereby, the browser emulator manager 23 identifies a Web site that has a possibility of performing environment dependent attacks.

Specifically, first, the browser emulator manager 23 sets a client environment of the browser emulator 25. The browser emulator manager 23 causes each browser emulator 25 to access a Web site (analysis target Web site 12) listed in a uniform resource locator (URL) list. The browser emulator manager 23 accumulates, in the analysis information database 24, results of the access from the browser emulator 25 to each Web site (for example, a URL of a destination of transition after the access to that Web site, an attack code, and the like) and the client environment set in that browser emulator 25. Thereafter, the browser emulator manager 23 identifies a Web site that causes a difference between results of access according to a difference between client environments, by referring to the information accumulated in the analysis information database.

The browser emulator manager 23 may accumulate results of access by setting a different client environment each time for one (or plural) browser emulator (emulators) 25, or may accumulate results of access by operating browser emulators 25 respectively set with different client environments. In the former case, the browser emulator manager 23 accumulates the results of access by repeating a process of: setting a client environment A for a browser emulator 25; accumulating results of access by the client environment A; setting a client environment B; and accumulating results of access by the client environment B.

The browser emulator manager 23 may generate a client environment by combining any OS, any browser, and any plugin together, but herein, a case will be described as an example, where the browser emulator manager 23 generates a client environment by using the information registered in the vulnerability information database 22 in order to efficiently identify a Web site that performs environment dependent attacks. Details of this browser emulator manager 23 will be described later.

The browser emulator 25 is a device that emulates operation of a browser. Applicable as this browser emulator 25 is, for example: a browser emulator provided by the Honeynet Project; or HtmlUnit or Selenium that has been developed as an open source. Details of this browser emulator 25 will be described later. In FIG. 1, the browser emulator 25 is illustrated as being constructed in the browser emulator manager 23, but the browser emulator 25 may be constructed outside the browser emulator manager 23.

The analysis information database 24 accumulates (stores) therein results of access by each browser emulator 25. Storage of data in this analysis information database 24 may use, similarly to that in the vulnerability information database 22, RDBMS, or the data may be stored in a text format. Details of this analysis information database 24 will be described later.

In this embodiment, although the browser emulator 25, the browser emulator manager 23, the vulnerability information collection device 21, the vulnerability information database 22, and the analysis information database 24 are arranged in the same network, they may be arranged in separate networks. Further, in order to securely connect each configuration, communication information may be encrypted by application of an existing encryption technique, or networks or configurations, in which the respective devices are arranged, may be connected via a virtual private network (VPN).

Next, by use of FIG. 2, the browser emulator manager 23 and the browser emulator 25 will be described in detail. The browser emulator manager 23 includes a control unit 27. The control unit 27 causes the browser emulator 25 to operate on a host system 26. This host system 26 uses, for example, an OS that the browser emulator manager 23 has. Details of the control unit 27 will be described later.

(Browser Emulator)

Next, the browser emulator 25 will now be described. The browser emulator 25 includes an information setting unit 250, an access unit 254, a hypertext markup language/cascading style sheets (HTML/CSS) parser 255, and a script interpreter unit 256.

When the information setting unit 250 obtains information on a client environment that its own browser emulator 25 is to emulate (client environment information) from a setting unit 272, the information setting unit 250 sets this client environment information in the browser emulator 25. This information setting unit 250 includes an OS information setting unit 251, a browser information setting unit 252, and a plugin information setting unit 253.

When the OS information setting unit 251 obtains the client environment information from the setting unit 272, the OS information setting unit 251 sets, based on this client environment information, OS information, for which the browser emulator 25 emulates the operation.

When the browser information setting unit 252 obtains the client environment information from the setting unit 272, the browser information setting unit 252 sets, based on this client environment information, browser information, for which the browser emulator 25 emulates the operation.

When the plugin information setting unit 253 obtains the client environment information from the setting unit 272, the plugin information setting unit 253 sets, based on this client environment information, plugin information, for which the browser emulator 25 emulates the operation.

The access unit 254 obtains Web contents by performing communication with a Web site (for example, the analysis target Web site 12 in FIG. 1) by hypertext transfer protocol (HTTP) or hypertext transfer protocol secure (HTTPS). Upon the communication by HTTP or HTTPS, the access unit 254 uses the OS information and the browser information set by the OS information setting unit 251 and the browser information setting unit 252, in the User-Agent field of the HTTP header. Thereby, the browser emulator 25 emulates arbitrary OS and browser. For the access unit 254, for example, cURL that has been developed as free software is used.

The access unit 254 records results of the access to the Web site in an access log. For example, if, as a result of accessing a Web site, transition to another URL is caused and a URL of that transition destination and Web contents are obtained, the access unit 254 records information on the obtained Web contents and the like as results of the access. The access unit 254 records the client environment information used upon the access to the Web site also in the access log. This access log is stored in a predetermined area of a storage unit (illustration thereof omitted) of the browser emulator 25.

The HTML/CSS parser 255 interprets the Web contents obtained by the access unit 254. Further, if, as a result of interpreting the Web contents, a script is included in the Web contents, the HTML/CSS parser 255 interprets the script by using the script interpreter unit 256.

The script interpreter unit 256 interprets the script, such as JavaScript (registered trademark), included in the Web contents. For example, if JavaScript (registered trademark) has been used as the script, the script interpreter unit 256 interprets the script by using SpiderMonkey, V8 JavaScript Engine, or the like developed as an open source.

A function that obtains information on the OS, the browser, and the plugin installed on the browser is present in the script. Thus, the browser emulator 25 needs to respond information on the OS, the browser, and the plugin emulated by the browser emulator 25 itself, to the script function that obtains such information. Therefore, the script interpreter unit 256 includes a script function hooking unit 257 that interrupts execution processing of the script function and causes arbitrary processing to be executed.

When the function that obtains the information on the OS, the browser, and the plugin is executed, the script interpreter unit 256 responds, by using the script function hooking unit 257, each of the OS information, the browser information, and the plugin information set in the browser emulator 25 by the OS information setting unit 251, the browser information setting unit 252, and the plugin information setting unit 253. Thereby, the browser emulator 25 emulates the set OS, browser, and plugin. This script function hooking unit 257 obtains information related to the script function, for example, the executed function name and argument information used in the function, and records the information, together with the URL of the accessed Web site and the client environment information used upon the access, into the access log.

Further, by use of a script, a function of an external plugin may be used. A function that obtains plugin information is present in this plugin function. Thus, similarly to the above described script function, the plugin information to be emulated by the browser emulator 25 needs to be responded to the plugin function that obtains the plugin information.

Accordingly, the script interpreter unit 256 includes a plugin function hooking unit 258 that interrupts instance generation processing related to the plugin or the execution processing of the function through the generated instance, and causes arbitrary processing to be executed.

When the function that obtains the plugin information is executed, the plugin function hooking unit 258 emulates the plugin by responding the plugin information set in the browser emulator 25.

The plugin function hooking unit 258 obtains information related to the plugin function, for example, the plugin name specified upon the generation of the instance, the function name used upon use of the function, or argument information, and records the information, together with the URL of the accessed Web site and the client environment information used upon the access, into the access log.

By using the script interpreter unit 256, the plugin function hooking unit 258 may respond a result of execution processing of the original script function or may respond a result of execution of arbitrary processing that has been set in advance.

The plugin function hooking unit 258 is unable to respond the result of execution processing of the original plugin function unless the corresponding plugin has been installed. Therefore, the plugin function hooking unit 258 responds a dummy instance when an instance related to the plugin is generated, and responds a result of execution of the dummy function that the dummy instance has when the function is executed through the instance (the result of execution of the dummy function again becoming a dummy instance). As described above, by the script function hooking unit 257 and the plugin function hooking unit 258 responding to the execution processing of the script function or the plugin function, execution errors of the script are able to be prevented from occurring.

According to the above described browser emulator 25, an arbitrary browser on an arbitrary OS is able to be emulated, and a state where an arbitrary plugin has been installed on the browser is able to be emulated. The OS emulated by the browser emulator 25 in once of access to a Web site is of a single type and of a single version, and the browser is of a single type and of a single version. Further, when a state where a plugin has been installed is emulated, the browser emulator 25 may emulate a state where plural types of plugins have been installed. In this case, each of the plugins is of a single version. The browser emulator 25 may emulate a state where a plugin has not been installed at all.

By use of FIG. 3, relations among OSs, browsers, and plugins, which are client environments emulated by the browser emulator 25, will be described.

Figures 3, 4:
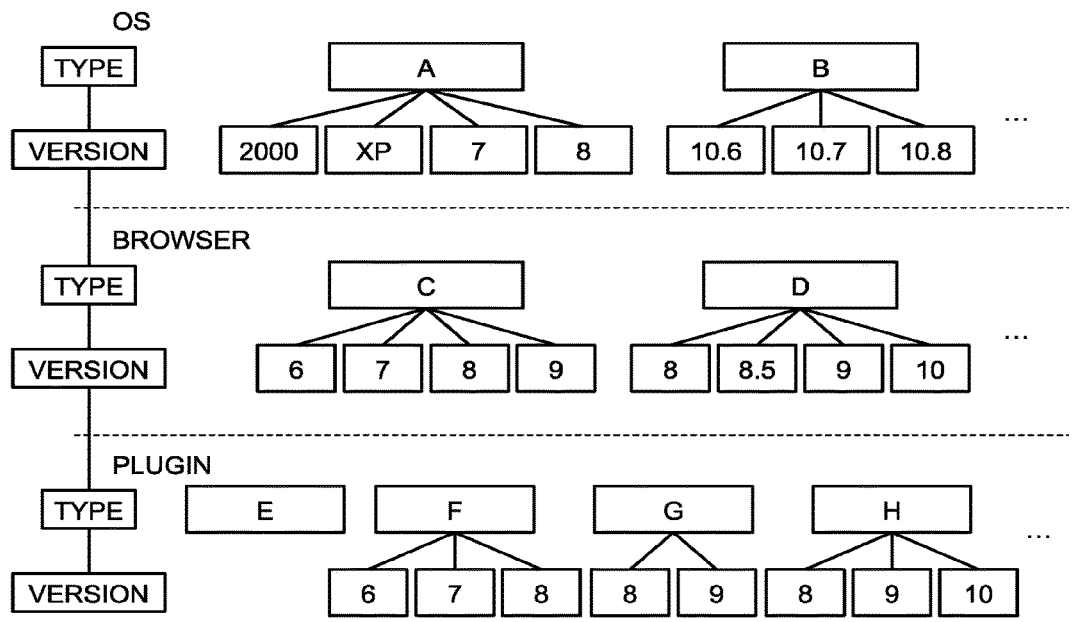
FIG. 3 is a diagram illustrating relations among OSs, browsers, and plugins, which are client environments emulated by the browser emulator.
FIG. 4 is a diagram illustrating an example of client environment information.

In FIG. 3, the OSs are A (for example, Windows (registered trademark)) and B (for example, Mac OS (registered trademark)); the browsers are C (for example, Internet Explorer (registered trademark)) and D (for example, Firefox (registered trademark)); the plugins are E (for example, ActiveX (registered trademark)), F (for example, Oracle JRE (registered trademark)), G (for example, Adobe Acrobat (registered trademark)), and H (for example, Adobe Flash Player (registered trademark)); and if there are plural versions for each, information on those versions is also illustrated.

In the browser emulator 25, an OS, a browser, and a plugin selected from these OSs, browsers, and plugins are set as a client environment. For example, in the browser emulator 25, a client environment is set, with: the OS, "A", of the version, "7"; the browser, "C", of the version, "9"; and the plugin, "G", of the version, "9", and the plugin, "H", of the version, "12".

An example of client environment information set in the browser emulator 25 is illustrated in FIG. 4. For example, when the access unit 254 obtains Web contents from a Web site, by information exemplified by FIG. 4 being used as User-Agent used upon HTTP communication, a state is emulated: where the OS, "A", of the version, "7"; the browser, "C", of the version, "9"; and the plugin, "G", of the version, "9", and the plugin, "H", of the version "12" have been installed. Further, by the plugin function hooking unit 258 responding with a response example of "navigator.plugins" illustrated in FIG. 4 when the property, "navigator.plugins" of the navigator object is referred to by JavaScript (registered trademark) of the Web site of the access destination, a state is emulated, where the plugin, "G", of the version, "9", and the plugin, "H", of the version, "12", have been installed on the browser.

(Browser Emulator Manager)

Next, the control unit 27 of the browser emulator manager 23 in FIG. 2 will be described in detail. The control unit 27 includes a client environment generation unit 271, the setting unit 272, a URL list generation unit 273, an access instruction unit 274, a registration processing unit 275, and an analysis unit 276.

The client environment generation unit 271 generates client environment information. For example, the client environment generation unit 271 obtains vulnerability information from the vulnerability information database 22, and based on this vulnerability information, generates the client environment information. In a specific example, in the vulnerability information database 22 illustrated in FIG. 5 and FIG. 6C, a target of "CVE-2009-2477" is the browser, "D", of the versions, "8" and "8.5". The client environment generation unit 271 generates information set with the versions, "8" and "8.5", of the browser, "D", for the client environment information used for the browser emulator 25. Thereby, a Web site that performs environment dependent attacks is able to be efficiently identified more than in a case where client environments are set comprehensively in the browser emulator 25. As this client environment information, information set by an administrator or the like of the system may be used.

The setting unit 272 sets a client environment for each browser emulator 25. Specifically, the setting unit 272 outputs the client environment information generated by the client environment generation unit 271 to the OS information setting unit 251, the browser information setting unit 252, and the plugin information setting unit 253, of the browser emulator 25.

The URL list generation unit 273 generates a URL list of Web sites patrolled by each browser emulator 25. For example, the URL list generation unit 273 generates the URL list, based on URLs of Web sites published in a blacklist of malicious Web sites open to the public.

The access instruction unit 274 instructs the access unit 254 of each browser emulator 25 to access a URL listed in the URL list.

The registration processing unit 275 obtains the access log of each browser emulator 25 and registers the access log into the analysis information database 24.

Details of this analysis information database 24 will now be described. The analysis information database 24 includes, for example, analysis information illustrated in FIG. 7A and access information illustrated in FIG. 7B.

The analysis information is information indicating, for each analysis ID, a URL (analyzed URL) of a Web site to be analyzed, and the client environment information of the browser emulator 25 used upon access to that URL (OS information, browser information, and plugin information). As the analyzed URL, the same URL as the URL listed in the URL list output by the access instruction unit 274 is described. Further, in the analysis information, from the client environment information, the OS information is described as the OS ID, the browser information as the browser ID, and the plugin information as the plugin ID.

The access information is information indicating results of access by the browser emulator 25, for example, the URL accessed in the process of accessing the analyzed URL (accessed URL), a time stamp thereof, attack code information, and the like. For example, the access information in FIG. 7B indicates, for each access ID, an analysis ID, a time stamp, an accessed URL, and attack code information. This analysis ID corresponds to the analysis ID indicated by the analysis information. Further, the attack code information is information, such as contents obtained by the access to the accessed URL, an executed function name, argument information used in the function, and the like.

For example, of the access information in FIG. 7B, information of the access ID, "2", indicates that: the analysis ID is "1" (that is, the analyzed URL is "http://example.com", the OS ID is "2", the browser ID is "1", and the plugin ID is "1"); at "2014/6/23 16:00:05.0000", "http://example.com/test.html" was accessed; and the attack codes executed upon the access to this URL are related to "G" and "E".

Figure 2:
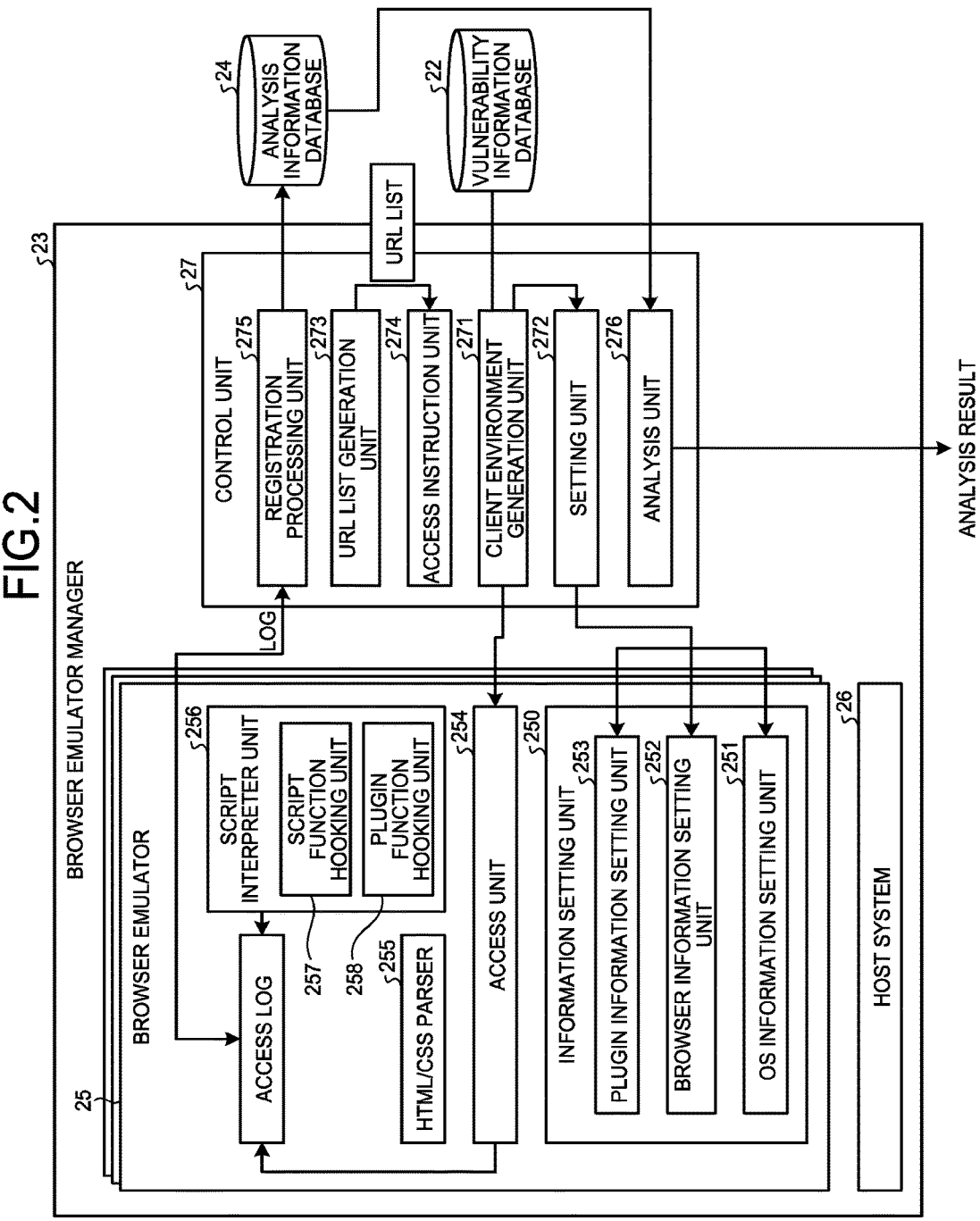
FIG. 2 is a diagram illustrating a configuration of a browser emulator.

The analysis unit 276 in FIG. 2 identifies a Web site that causes a difference between results of access according to a difference between client environments, by referring to the results of access by the browser emulator 25 in the analysis information database 24.

For example, information of the analysis IDs, "1" and "2", in the analysis information of the analysis information database 24 in FIG. 7A means that the browser emulator 25 analyzes the same URL with the plugin information of the client environment information being changed. As to the information corresponding to the analysis IDs, "1" and "2", in the access information in FIG. 7B (information of access IDs, "1", "2", "3", "10", and "11"), for the analysis ID, "1", the browser emulator 25 accesses a total of three URLs. On the contrary, for the analysis ID, "2", only a total of two URLs are accessed. Further, at the URL of the second access destination for the analysis ID, "1", functions related to "G" and "E" are executed, but at the URL of the second accessed destination for the analysis ID, "2", only the function related to "G" is executed. The analysis unit 276 identifies such a Web site causing a difference between results of access (for example, accessed URLs or executed functions) due to a difference between client environments. Details of the processing by this analysis unit 276 will be described later by use of a flow chart.

(Processing Sequences)

Figure 8:
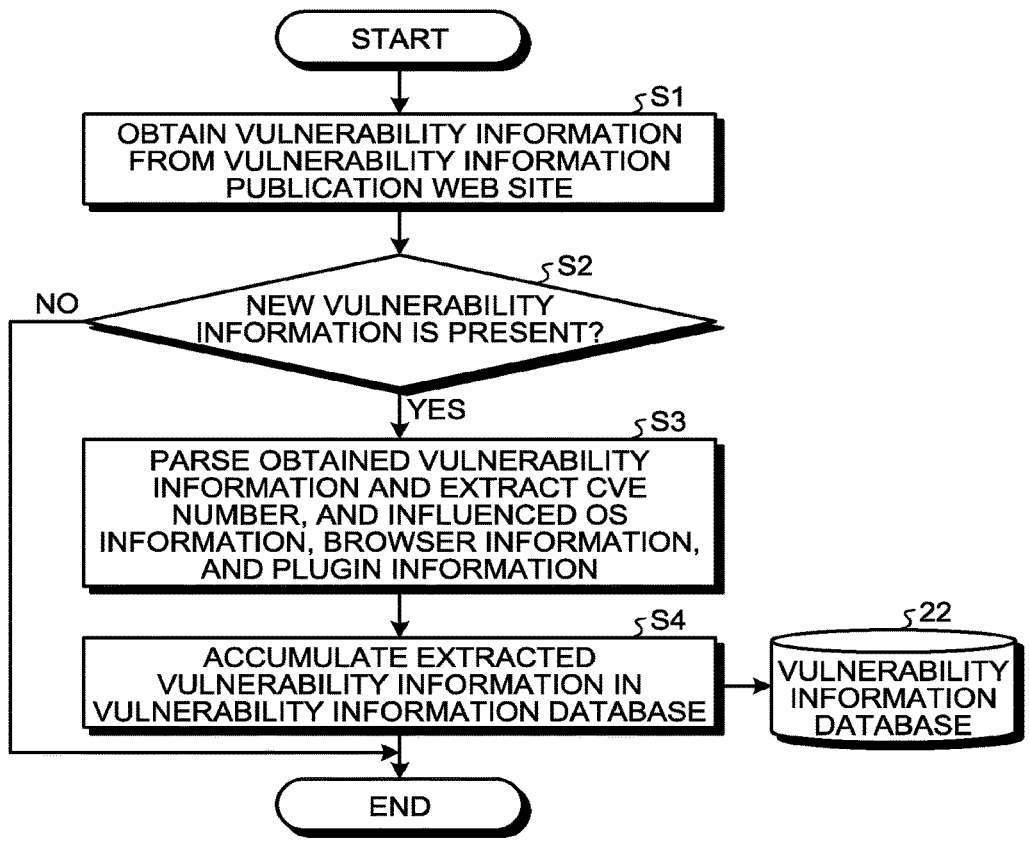
FIG. 8 is a flow chart illustrating a processing sequence of a vulnerability information collection device.

Next, processing sequences of the system will be described. Firstly, by use of FIG. 8, a processing sequence of the vulnerability information collection device 21 will be described.

First, the vulnerability information collection device 21 obtains vulnerability information from the vulnerability information publication Web site 11 (S1); and if new vulnerability information (vulnerability information that has not been registered in the vulnerability information database 22 yet) is present therein (S2; Yes), the vulnerability information collection device 21 parses the obtained vulnerability information and extracts a CVE number, and influenced OS information, browser information, and plugin information (S3). The vulnerability information collection device 21 accumulates the extracted vulnerability information in the vulnerability information database 22 (see FIG. 5, FIG. 6A, FIG. 6B, and FIG. 6C) (S4). On the contrary, if new vulnerability information is not present therein (S2; No), the vulnerability information collection device 21 ends the processing.

Figure 9:
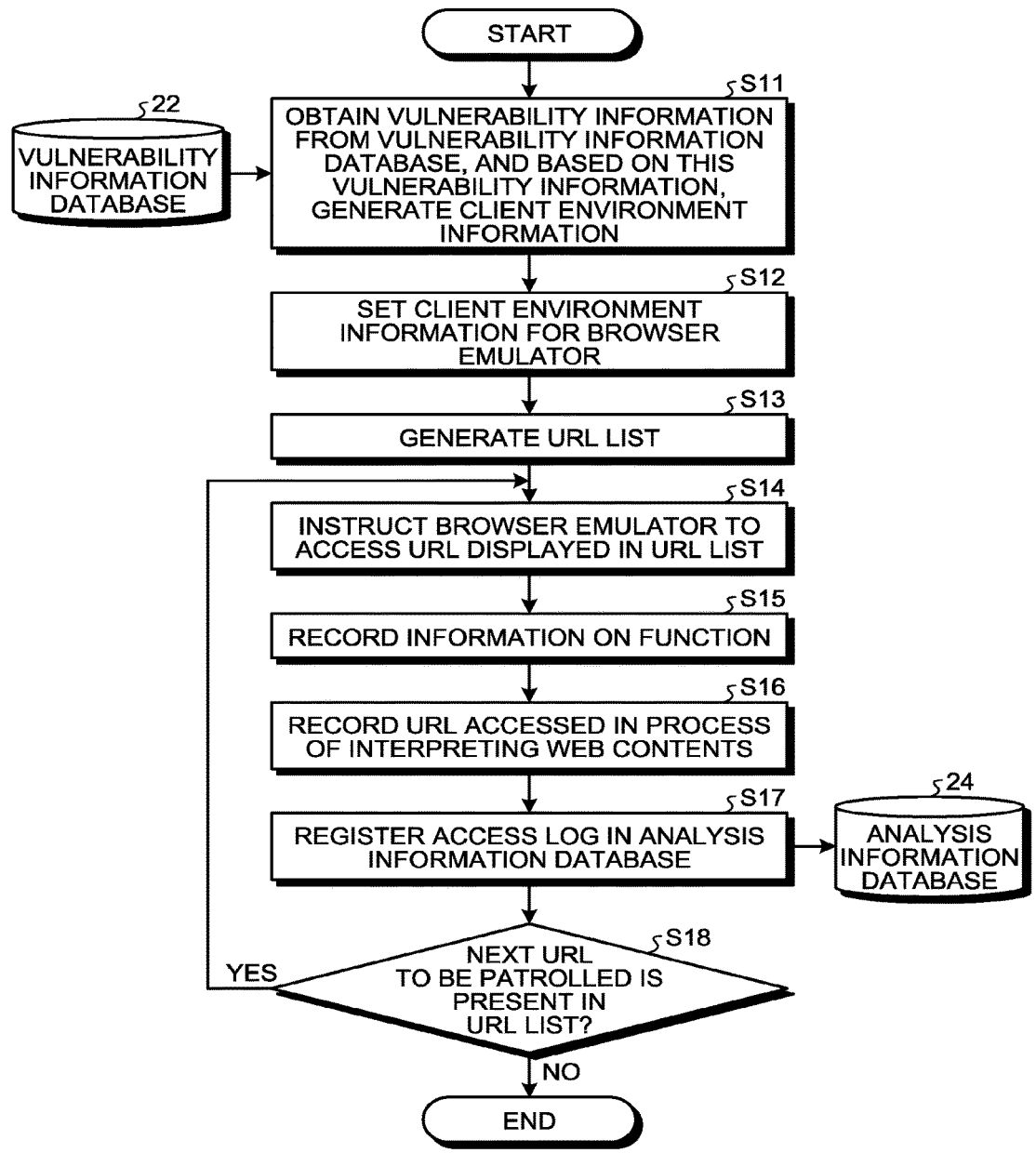
FIG. 9 is a flow chart illustrating a processing sequence of a browser emulator manager and the browser emulator.

Next, by use of FIG. 9, a processing sequence of the browser emulator manager 23 will be described. First, the client environment generation unit 271 of the browser emulator manager 23 obtains vulnerability information from the vulnerability information database 22, and generates, based on this vulnerability information, client environment information (S11). The setting unit 272 then sets this client environment information in the browser emulator 25 (S12).

After S12, the URL list generation unit 273 generates a URL list (S13). For example, the URL list generation unit 273 generates the URL list, based a blacklist of malicious Web sites open to the public. The access instruction unit 274 then instructs the browser emulator 25 to access a URL listed in the URL list (S14). The access unit 254 of the browser emulator 25 that has received this instruction accesses that URL and obtains Web contents thereof.

After S14, the HTML/CSS parser 255 of the browser emulator 25 interprets the obtained Web contents, and when execution of a script function or a plugin function is detected by the script interpreter unit 256, the HTML/CSS parser 255 records information on this function (attack code information) in the access log (S15). That is, execution of a content script function or plugin function obtained by the script interpreter unit 256 is monitored, and a result of the execution is recorded in the access log. Further, the access unit 254 records the URL (accessed URL) accessed in the process of interpreting the Web contents, into the access log (S16). Furthermore, in this access log, the client environment information set in the browser emulator 25 is also recorded.

After S16, the registration processing unit 275 of the browser emulator manager 23 registers the access log of the browser emulator 25 in the analysis information database 24 (S17). For example, the registration processing unit 275 registers, from the information recorded in the access log, the URL (analyzed URL) instructed by the access instruction unit 274 and the client environment information set in the browser emulator 25, in the analysis information (see FIG. 7A) of the analysis information database 24. Further, the registration processing unit 275 registers the URL instructed by the access instruction unit 274, the URL (accessed URL) of a destination of transition as a result of the access to the URL, and attack code information at each URL, in the access information of the analysis information database 24 (see FIG. 7B).

After S17, the access instruction unit 274 returns to S14 if there is any URL that has not been patrolled by the browser emulator yet in the URL list (S18; Yes), and ends the processing if all of the URLs listed in the URL list have been patrolled (S18; No).

Figure 10:
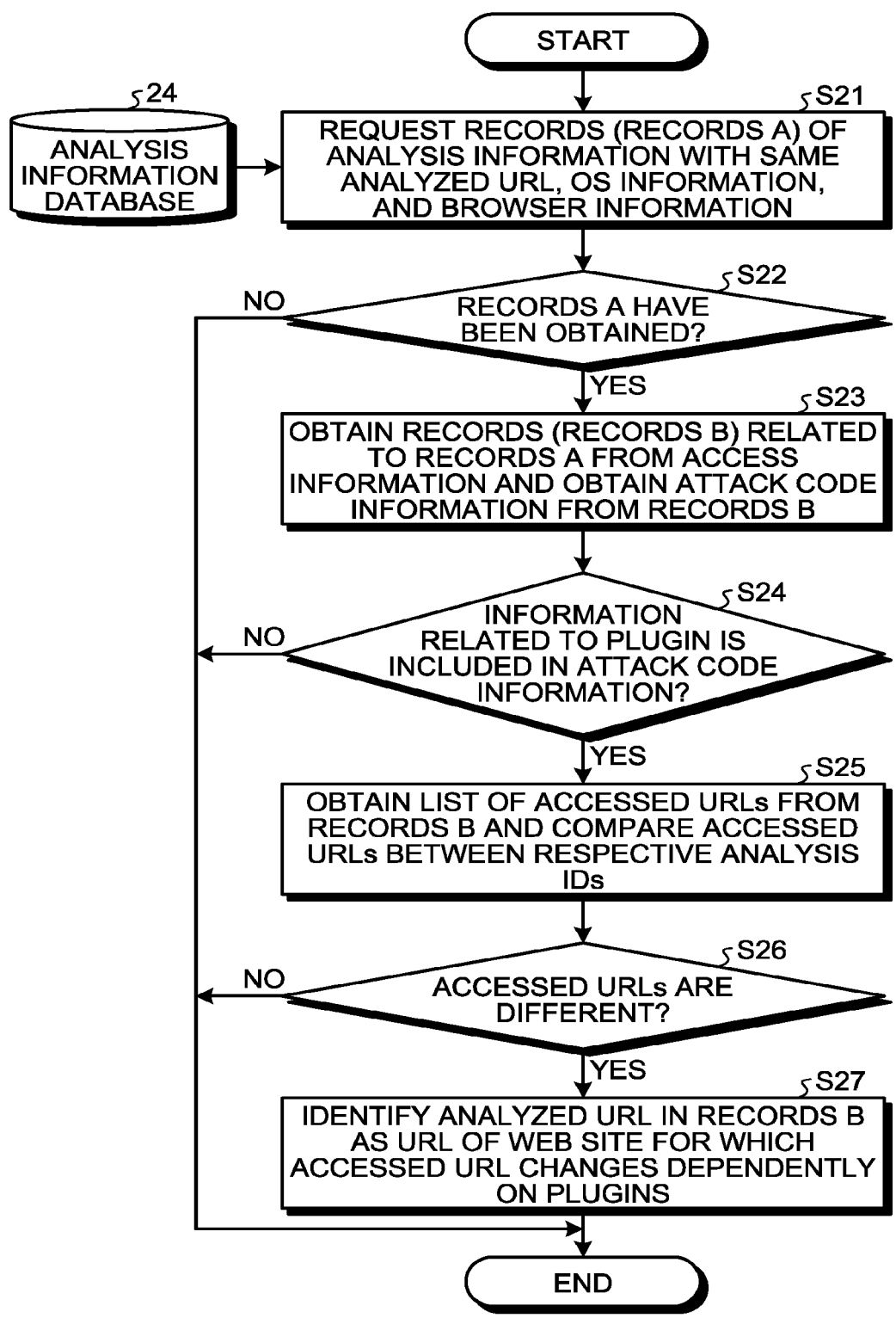
FIG. 10 is a flow chart illustrating a processing sequence of an analysis unit of the browser emulator manager.

Next, by use of FIG. 10, a processing sequence of the analysis unit 276 of the browser emulator manager 23 will be described. A case where the analysis unit 276 identifies a URL of a Web site that has a possibility of performing attacks caused by plugin information of a browser will be described as an example.

First, the analysis unit 276 requests the analysis information database 24 for records (records A) of analysis information with the same analyzed URL, OS information, and browser information (S21). When the analysis unit 276 is able to obtain the records A from the analysis information database 24 (S22; Yes), the analysis unit 276 obtains, from the access information of the analysis information database 24, records (records B) related to the records A and obtains attack code information from the records B (S23). On the contrary, if the analysis unit 276 is unable to obtain the records A from the analysis information database 24 (S22; No), the processing is ended.

For example, the analysis unit 276 obtains, from the analysis information illustrated in FIG. 7A, records of the analysis IDs, "1", "2", and "3", having the same OS information and browser information. The analysis unit 276 then obtains, from the access information illustrated in FIG. 7B, as the records related to the analysis IDs, "1", "2", and "3", the records B, which are records of the access IDs, "1", "2", "3", "10", "11", and "12", and obtains the attack code information, "G" and "E", from the records B.

After S23, if the attack code information obtained in S23 includes information related to a plugin (for example, a function execution log related to a plugin) (S24; Yes), since this may be an environment dependent attack, the analysis unit 276 proceeds to S25. On the contrary, if information related to a plugin is not included in the attack code information (S24; No), the processing is ended. For example, if the attack code information, "G" and "E", in the access information in FIG. 7B is information related to a plugin, the processing proceeds to S25.

The analysis unit 276 obtains a list of accessed URLs in the records B, compares the accessed URLs between the analysis IDs (S25), and if the accessed URLs are different from each another (S26; Yes), identifies the analyzed URL in these records B as a URL of a Web site, for which the accessed URL changes dependently on the plugins (S27). The analysis unit 276 then outputs the URL of this Web site as an analysis result. On the contrary, if the accessed URLs are the same (S26; No), the processing is ended.

For example, the analysis unit 276 determines that, in the access information in FIG. 7B, access destination URLs in the records having the analysis ID, "1" (the records with the access IDs, "1", "2", and "3"), are "http://example.com", "http://example.com/test.html", and "http://example.com/mal.pdf"; but access destination URLs in the records having the analysis ID, "2" (the records with the access IDs, "10" and "11"), are "http://example.com" and "http://example.com/test.html", and an access destination URL in the record having the analysis ID, "3" (the record with the access ID, "12"), is "http://example.com". Therefore, at S27, the analysis unit 276 identifies the analyzed URL, "http://example.com", of these records, as a URL of a Web site, for which the accessed URL changes dependently on the plugins. The analysis unit 276 then output this URL, "http://example.com", as the analysis result.

In this manner, the browser emulator manager 23 is able to identify a URL of a Web site that has a possibility of performing an attack caused by plugin information of a browser.

Although the case where the analysis unit 276 identifies a URL of a Web site that has a possibility of performing an attack caused by plugin information of a browser has been described as an example herein, a URL of a Web site that has a possibility of performing an attack caused by OS information or browser information may be identified.

According to the above described system, since the browser emulator 25 accesses a Web site by emulating various client environments (OSs, browser information, and plugin information) and is able to obtain results of the access, identification of a URL of a Web site having a possibility of performing environment dependent attacks is facilitated. Further, since the system generates the client environment information for the browser emulator 25 by using the vulnerability information, the above described identification of the URL of the Web site is able to be performed efficiently.

Other Embodiments

In the above described system according to the embodiment, the client environment information of the browser emulator 25 may be generated as described below.

For example, in the system, the CVE include vulnerabilities with contents influencing plural OSs, browsers, and plugins. In each version of the OSs, browsers, and plugins, plural vulnerabilities (CVE) are present. That is, even between different client environments, the same CVE may be present. That is, even if client environments of the browser emulator 25 are different, the same attack code may be observed overlappingly. Thus, in order to make the analysis by the analysis unit 276 more efficient, the client environment generation unit 271 generates the client environment information as described below.

For example, if analysis related to the CVE influencing Adobe Acrobat (registered trademark) of the plugins is desired to be performed, the client environment generation unit 271 refers to the vulnerability information database 22 and lists up CVE related to each version of Adobe Acrobat (registered trademark). Next, the client environment generation unit 271 selects client environments in order from Adobe Acrobat (registered trademark) of a version in which more CVE are present. The client environment generation unit 271 then ends the selection of client environments when CVE influencing Adobe Acrobat (registered trademark) have been covered. The client environment generation unit 271 then generates client environment information by using the client environments selected. In this way, the client environment generation unit 271 is able to generate the client environment information that enables reduction of overlapping observation of attack codes. As a result, the system is able to perform analysis of URLs efficiently.

Further, the analysis unit 276 identifies a Web site causing a difference between results of access (for example, accessed URLs or executed functions) due to a difference between client environments, but limitation is not made thereto. For example, the analysis unit 276 may identify elements (the OS, the browser, the plugin, and the like) of the client environments that have caused the difference in the results of access by comparing these client environments when a difference is generated between the results of access due to the difference between the client environments of the browser emulator 25. In this way, the analysis unit 276 is able to identify what kind of client environment the browser being attacked by the Web site has.

Further, registration of information into the analysis information database 24 has been described as being performed by the registration processing unit 275, but limitation is not made thereto. For example, the browser emulator 25 itself may register information on the access log into the analysis information database 24.

(Program)

Further, a program, which describes the above described processing executed by the browser emulator 25 and the browser emulator manager 23 according to the embodiment in a language executable by a computer, may be generated and executed. In this case, by the computer executing the program, effects that are the same as the above described embodiments are able to be obtained. Moreover, by recording that program in a computer readable recording medium and causing the computer to load and execute the program recorded in this recording medium, processing that is the same as that of the above described embodiments may be realized. Hereinafter, an example of a computer, which executes a program realizing functions that are the same as those of the browser emulator 25 and the browser emulator manager 23, will be described.

FIG. 11 is a diagram illustrating the computer that executes the above described program. As illustrated in FIG. 11, a computer 1000 has, for example, a memory 1010, a central processing unit (CPU) 1020, a hard disk drive interface 1030, a disk drive interface 1040, a serial port interface 1050, a video adapter 1060, and a network interface 1070. These units are connected to one another via a bus 1080.

The memory 1010 includes a read only memory (ROM) 1011 and a random access memory (RAM) 1012. The ROM 1011 stores therein a boot program, such as Basic Input Output System (BIOS), for example. The hard disk drive interface 1030 is connected to a hard disk drive 1090. The disk drive interface 1040 is connected to a disk drive 1100. An attachable and detachable storage medium, such as a magnetic disk or an optical disk, for example, is inserted in the disk drive 1100. A mouse 1110 and a keyboard 1120, for example, are connected to the serial port interface 1050. A display 1130, for example, is connected to the video adapter 1060.

As illustrated in FIG. 11, the hard disk drive 1090 stores therein, for example, an OS 1091, an application program 1092, a program module 1093, and program data 1094. Each piece of information described in the above embodiments is stored in, for example, the hard disk drive 1090 or the memory 1010.

Further, the program is stored, for example, as a program module, in which commands executed by the computer 1000 are described, in the hard disk drive 1090. Specifically, a program module, in which the processing executed by the browser emulator 25 and the browser emulator manager 23 described in the above embodiments is described, is stored in the hard disk drive 1090.

Further, data used in information processing by the program are stored as program data in, for example, the hard disk drive 1090. The CPU 1020 loads the program module 1093 and the program data 1094 stored in the hard disk drive 1090 as necessary into the RAM 1012 and executes the above described sequences.

The program module 1093 and the program data 1094 related to the program are not necessarily stored in the hard disk drive 1090, and for example, may be stored in an attachable and detachable storage medium and read out by the CPU 1020 via the disk drive 1100 or the like. Or, the program module 1093 and the program data 1094 related to the program may be stored in another computer connected via a network, such as a local area network (LAN) or a wide area network (WAN), and read out by the CPU 1020 via the network interface 1070.

REFERENCE SIGNS LIST 1, 2 NETWORK
3 PACKET TRANSFER DEVICE
11 VULNERABILITY INFORMATION PUBLICATION WEB SITE
12 ANALYSIS TARGET WEB SITE
21 VULNERABILITY INFORMATION COLLECTION DEVICE
22 VULNERABILITY INFORMATION DATABASE
23 BROWSER EMULATOR MANAGER
24 ANALYSIS INFORMATION DATABASE
25 BROWSER EMULATOR
26 HOST SYSTEM
27 CONTROL UNIT
250 INFORMATION SETTING UNIT
251 OS INFORMATION SETTING UNIT
252 BROWSER INFORMATION SETTING UNIT
253 PLUGIN INFORMATION SETTING UNIT
254 ACCESS UNIT
255 HTML/CSS PARSER
256 SCRIPT INTERPRETER UNIT
257 SCRIPT FUNCTION HOOKING UNIT
258 PLUGIN FUNCTION HOOKING UNIT
271 CLIENT ENVIRONMENT GENERATION UNIT
272 SETTING UNIT
273 URL LIST GENERATION UNIT
274 ACCESS INSTRUCTION UNIT
275 REGISTRATION PROCESSING UNIT
276 ANALYSIS UNIT

The invention claimed is:

1. A construction device that constructs at least one browser emulator device for emulating operation of a browser, the construction device comprising:
processing circuitry configured to
set a client environment of the at least one browser emulator device, the client environment being arbitrary values of types and versions of an operating system (OS), a browser, and a plugin;
instruct the at least one browser emulator device to access one or more Web sites;
accumulate, in an analysis information database, results of access to the one or more Web sites by the at least one browser emulator device when a plurality of different client environments are configured for the at least one browser emulator device when accessing each of the one or more Web sites, in association with information on the different client environments emulated upon the access to each of the one or more Web sites; and
refer to the results of access by the at least one browser emulator device in the analysis information database and identify a Web site causing a difference between the results of access to the Web site, wherein at least one of the results of the access to the Web site causes a malicious operation to occur, according to a difference between the client environments that are configured when the at least one browser emulator device accesses the Web site,
wherein the at least one browser emulator device is configured to, when a Web site, from among the one or more Web sites instructed to be accessed, uses a plugin function,
interrupt execution processing of the plugin function used,
obtain information related to the executed plugin function,
output the obtained information related to the plugin function and information on a Uniform Resource Locator (URL) that is accessed upon execution of the plugin function,
return, to the Web site, a response to the execution processing of the plugin function, the response being an arbitrary value that has been set in advance, and
wherein when the information on the URL that is accessed upon execution of the plugin function is different between different client environments, identify the Web site to be accessed as a Web site causing a difference between the results of access to the Web site dependently on the plugin function.

2. The construction device according to claim 1, wherein the processing circuitry obtains information related to vulnerabilities of browsers and plugins from an external device and generates the client environments by using the information related to the vulnerabilities.

3. The construction device according to claim 1, wherein the at least one browser emulator device is a plurality of browser emulator devices and the processing circuitry sets different client environments respectively for the plurality of browser emulator devices, and
refers to results of access by the plurality of browser emulator devices, and identifies the Web site causing a difference between the results of access according to a difference between the client environments.

4. The construction device according to claim 1, wherein the at least one browser emulator device is configured to
set an arbitrary operating system (OS), an arbitrary browser, and an arbitrary plugin as a client environment of the browser emulator device itself, and
access an external Web site by emulating the OS, the browser, and the plugin set as the client environment upon the access, and output a result of the access to the Web site and information on the client environment used upon the access to the Web site.

5. The construction device according to claim 1, wherein the at least one browser emulator device is configured to, when a Web site to be accessed uses a script:
interrupt execution processing of a script function used by the script;
obtain information related to the executed script function;
output the obtained information related to the script function and information on the accessed Web site, and
return, to the Web site, a response to the execution processing of the script function, the response being: execution processing of a function by a script interpreter; or an arbitrary value that has been set in advance.

6. A construction method including steps, in which a construction device that constructs at least one browser emulator device for emulating operation of a browser executes:
setting a client environment of the at least one browser emulator device, the client environment being arbitrary values of types and versions of an operating system (OS), a browser, and a plugin;
instructing the at least one browser emulator device to access one or more Web sites;
accumulating, in an analysis information database, results of access to the one or more Web sites by the at least one browser emulator device when a plurality of different client environments are configured for the at least one browser emulator device when accessing each of the one or more Web sites, in association with information on the different client environments emulated upon the access to each of the one or more Web sites; and
referring to the results of access by the at least one browser emulator device in the analysis information database and identify a Web site causing a difference between the results of access to the Web site, wherein at least one of the results of the access to the Web site causes a malicious operation to occur, according to a difference between the client environments that are configured when the at least one browser emulator device accesses the Web site,
wherein the at least one browser emulator device is configured to, when a Web site, from among the one or more Web sites instructed to be accessed, uses a plugin function,
interrupt execution processing of the plugin function used,
obtain information related to the executed plugin function,
output the obtained information related to the plugin function and information on a Uniform Resource Locator (URL) that is accessed upon execution of the plugin function,
return, to the Web site, a response to the execution processing of the plugin function, the response being an arbitrary value that has been set in advance, and
wherein when the information on the URL that is accessed upon execution of the plugin function is different between different client environments, the method includes identifying the Web site to be accessed as a Web site causing a difference between the results of access to the Web site dependently on the plugin function.

7. A non-transitory computer readable storage medium having stored therein a construction program that is a construction program for constructing at least one browser emulator device that emulates operation of a browser, the construction program causing a computer to execute a process comprising:
setting a client environment of the at least one browser emulator device, the client environment being arbitrary values of types and versions of an operating system (OS), a browser, and a plugin;
instructing the at least one browser emulator device to access one or more Web sites;
accumulating, in an analysis information database, results of access to the one or more Web sites by the at least one browser emulator device when a plurality of different client environments are configured for the at least one browser emulator device when accessing each of the one or more Web sites, in association with information on the different client environments emulated upon the access to each of the one or more Web sites; and
referring to the results of access by the at least one browser emulator device in the analysis information database and identify a Web site causing a difference between the results of access to the Web site, wherein at least one of the results of the access to the Web site causes a malicious operation to occur, according to a difference between the client environments that are configured when the at least one browser emulator device accesses the Web site,
wherein the at least one browser emulator device is configured to, when a Web site, from among the one or more Web sites instructed to be accessed, uses a plugin function,
interrupt execution processing of the plugin function used,
obtain information related to the executed plugin function,
output the obtained information related to the plugin function and information on a Uniform Resource Locator (URL) that is accessed upon execution of the plugin function,
return, to the Web site, a response to the execution processing of the plugin function, the response being an arbitrary value that has been set in advance, and wherein when the information on the URL that is accessed upon execution of the plugin function is different between different client environments, the method includes identifying the Web site to be accessed as a Web site causing a difference between the results of access to the Web site dependently on the plugin function.

* * * * *